United States Patent [19]

Walker et al.

[11] Patent Number: 5,771,390
[45] Date of Patent: Jun. 23, 1998

[54] SYSTEM AND METHOD FOR CASCADING FROM A POWER MANAGED SUSPEND STATE TO A SUSPEND-TO-DISK STATE IN A COMPUTER SYSTEM

[75] Inventors: James Walker, Cedar Park; John Pearce, Del Valle, both of Tex.

[73] Assignee: Dell USA, L.P., Austin, Tex.

[21] Appl. No.: 697,432

[22] Filed: Aug. 23, 1996

Related U.S. Application Data

[63] Continuation of Ser. No. 369,017, Jan. 5, 1995, abandoned.

[51] Int. Cl.⁶ ....................................................... G06F 1/32
[52] U.S. Cl. ....................................................... 395/750.07
[58] Field of Search ........................... 395/750.01–750.08; 364/707

[56] References Cited

U.S. PATENT DOCUMENTS

| | | | |
|---|---|---|---|
| 5,167,024 | 11/1992 | Smith et al. | 395/375 |
| 5,218,704 | 6/1993 | Watts, Jr. et al. | 395/750 |
| 5,274,797 | 12/1993 | Barlow et al. | 395/750 |
| 5,396,635 | 3/1995 | Fung | 395/750 |
| 5,423,045 | 6/1995 | Kannan et al. | 395/750 |

*Primary Examiner*—Gopal C. Ray
*Assistant Examiner*—Paul R. Myers
*Attorney, Agent, or Firm*—Haynes and Boone, L.L.P.

[57] ABSTRACT

A system and method for enabling a computer system to cascade from the suspend state to the zero volt suspend-to-disk state. The system and method uses the computer system's real time clock (RTC) to provide an alarm indicating when the computer system should enter the suspend-to-disk state. The RTC is used because this device is active even when the computer system is in an ultra low power state, such as the suspend state. The present invention also includes a method which prevents the power management or system management software from interfering with other application's use of the RTC alarm.

7 Claims, 3 Drawing Sheets

SYSTEM AND METHOD FOR CASCADING FROM A POWER MANAGED SUSPEND STATE TO A SUSPEND-TO-DISK STATE IN A COMPUTER SYSTEM

This is a continuation of application Ser. No. 08/369,017 filed on Jan. 5, 1995, now abandoned.

FIELD OF THE INVENTION

The present invention relates to power management in computer systems, and more particularly to a system and method for cascading from a suspend state to a zero volt suspend-to-disk state using the computer system real time clock (RTC) as the cascade alarm.

DESCRIPTION OF THE RELATED ART

Power management has been a principal area of research in computer system design. For example, one category of computer systems may be referred to as portable computer systems, including laptop systems, notebook systems, sub-notebook systems, etc. Portable computer systems generally operate from one or more batteries, and thus power management has been a major focus of portable computer system design. In addition, due to the prevalence of computer systems in modern society, as well as the environmental desirability of "green PCs", power management in desktop computer systems is also of major importance.

Power management in computer systems generally involves operating the computer system in various reduced power modes, with each mode consuming less power and offering less functionality to the user. Thus, if the user's attention is diverted for a period of time and no significant operations are occurring on the computer system, power management or system management software in the computer system can direct the system to "power down" to one or more reduced power states.

In general, a computer system with power management software may have a plurality of states consuming varying amounts of power. A state referred to as the "full on" state indicates normal operation of the computer system where all of the peripherals and external devices are powered on. A first reduced power state referred to as "standby" is the first stage of power management and generally provides good power savings. In the standby state, the hard disk is typically powered down and various components and peripherals may be subject to reduced power. The second stage in power management is referred to as the "suspend" state, and this state provides excellent power savings. In the suspend state, a greater number of components and peripherals are subject to reduced power. A third stage in power management can be referred to as "suspend-to-disk," where power to the computer system is completely removed, i.e., power is off. However, the hard drive maintains the current configuration of the computer system so that, when power is reapplied to the computer system, the computer system can resume its prior status. The term "resume" is used to indicate the process of the computer system transferring from one of the reduced power or low power states to the full on state.

In general, cascading from the suspend state to the zero volt suspend-to-disk state is a very important power saving feature which provides increased savings. However, power managed computer systems are generally restricted in their activities while in the suspend state. For example, a power-managed computer system typically uses one or more timers to determine when operations on the computer have ceased for a sufficient period of time such that the computer system should transfer from a first power state to a lesser power state, such as from the full on state to the standby state, or from the standby state to the suspend state, etc. When the computer system is in the suspend state, these timers are not operational. Thus, transferring from the suspend state to the suspend-to-disk state has heretofore been unattainable because timers conventionally used in the computer system are not available in the suspend state.

Therefore, prior art computer systems have typically avoided the suspend state. However, by removing the suspend state from the power down transition, suchcomputer systems spend more time in the standby state, and thus these systems provide less than optimal power savings. Therefore, a system and method is desired which provides a mechanism for transferring or cascading a computer system from the suspend state to the suspend-to-disk state.

SUMMARY OF THE INVENTION

The present invention comprises a system and method for enabling a computer system to cascade from the suspend state to the zero volt suspend-to-disk state. The system and method uses the computer system's real time clock (RTC) to provide an alarm indicating when the computer system should enter the suspend-to-disk state. The RTC is used because this device is active even when the computer system is in an ultra low power state, such as the suspend state. The present invention also includes a method which prevents the power management or system management software from interfering with other application's use of the RTC.

When the computer system is in the full-on state during normal use, a period of inactivity, which may be preset by the user, triggers the system management software to cause the computer system to enter a standby state, which is a first stage of reduced power. After an additional period of inactivity, system management software is again triggered to place the computer system in the suspend state. Prior to entering the suspend state, the system management software examines the RTC to determine if an RTC alarm has been set by an application. The RTC is used by computer applications for various timing functions, and thus the RTC alarm may have been set to expire at a certain period of time. However, in general, the RTC alarm is rarely used by user applications. If the RTC alarm is set, the software determines if the time set is less than the additional time period of inactivity for the computer system to enter the suspend-to-disk state.

If the RTC does not have an alarm set or the RTC alarm is set to expire after the time that the transition to the suspend-to-disk state would occur, then the system management software stores this RTC alarm data and reprograms the RTC to generate an alarm interrupt at the time that the system should enter the suspend-to-disk state. If the RTC alarm has been set by an application and the time is less than the time to enter the suspend-to-disk state, then the system does not store the current state of the RTC alarm and reprogram the alarm. The computer system then enters the suspend state, i.e., the system management software shuts down various components to place the computer system in the suspend state.

When a resume event occurs, such as the user hitting a key, or the RTC alarm, the system management software is invoked and determines if the resume event was an RTC alarm indicating a cascade to the suspend-to-disk state. If the resume event was not an RTC alarm, but rather was the user hitting a key on the keyboard, then the computer system resumes normal operations. Also, if the resume event was an RTC alarm set by an application, the computer system resumes normal operations. If the resume event was an RTC alarm indicating a suspend-to-disk alarm, then the computer system enters the suspend-to-disk state.

Therefore, the computer system of the present invention uses the RTC for power management functions to enable the computer system to cascade from the suspend state to the suspend-to-disk state according to user programmable periods of inactivity. The system and method of the present invention intelligently manages the RTC alarm to not interfere with user applications while allowing transitions to the low power suspend-to-disk state. The availability of the suspend-to-disk state increases the power saving features of the computer system.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
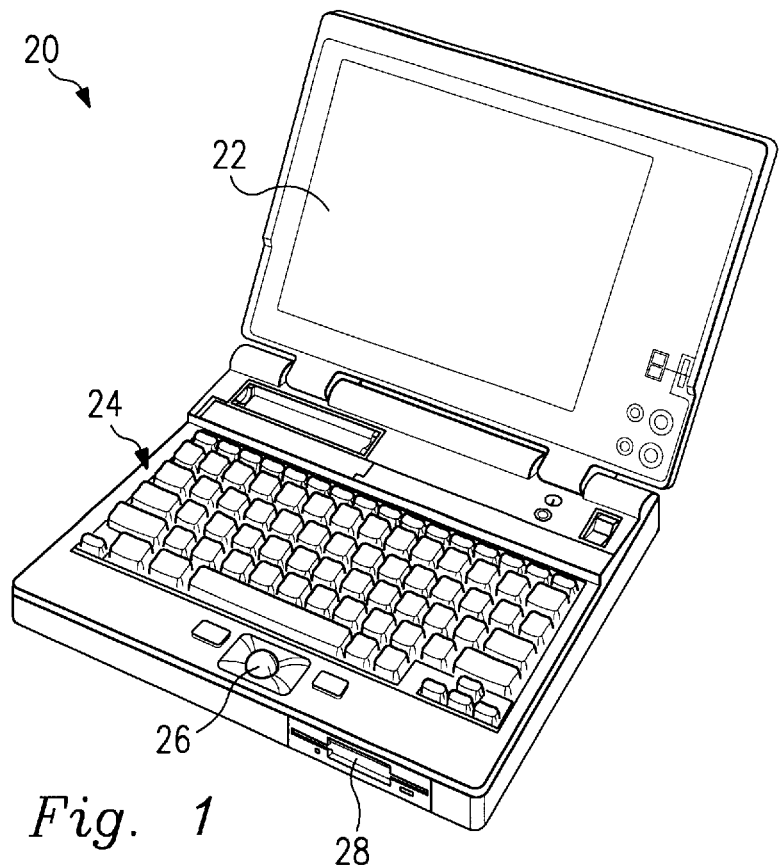
FIG. 1 illustrates a portable computer system including the power management capabilities of the present invention.

Referring now to FIG. 1, a portable computer system 20 including power management or system management software according to the preferred embodiment of the invention is shown. As shown, the computer system 20 includes a display screen 22, keyboard 24, track ball or mouse 26, and floppy drive 28. The computer system includes system management software which, based on varying periods of inactivity, causes the computer system to enter various reduced power states. A state referred to as "full on" indicates the computer system is operating normally without any power saving features, and all peripherals and devices are powered on. A state referred to as "standby" is a first stage in power management, wherein the hard disk is powered down with various of the components and peripherals either fully operational or executing with reduced power. A state referred to as "suspend" is a second power management stage where a greater number of components and peripherals are turned off or are subject to reduced power. In this stage, the hard disk remains powered off, backlighting is reduced to the display screen 22, the microprocessor speed is reduced, and various other peripherals are turned off or reduced. The third and last stage of power management is referred to as the "suspend-to-disk" or S2D state. In this state, the power to the computer system is completely off, and thus no power is consumed by the computer system. A process referred to as "resume" causes a transition from one of the low power states, i.e., the standby state, suspend state, or S2D state, to the full on state.

Figure 2:
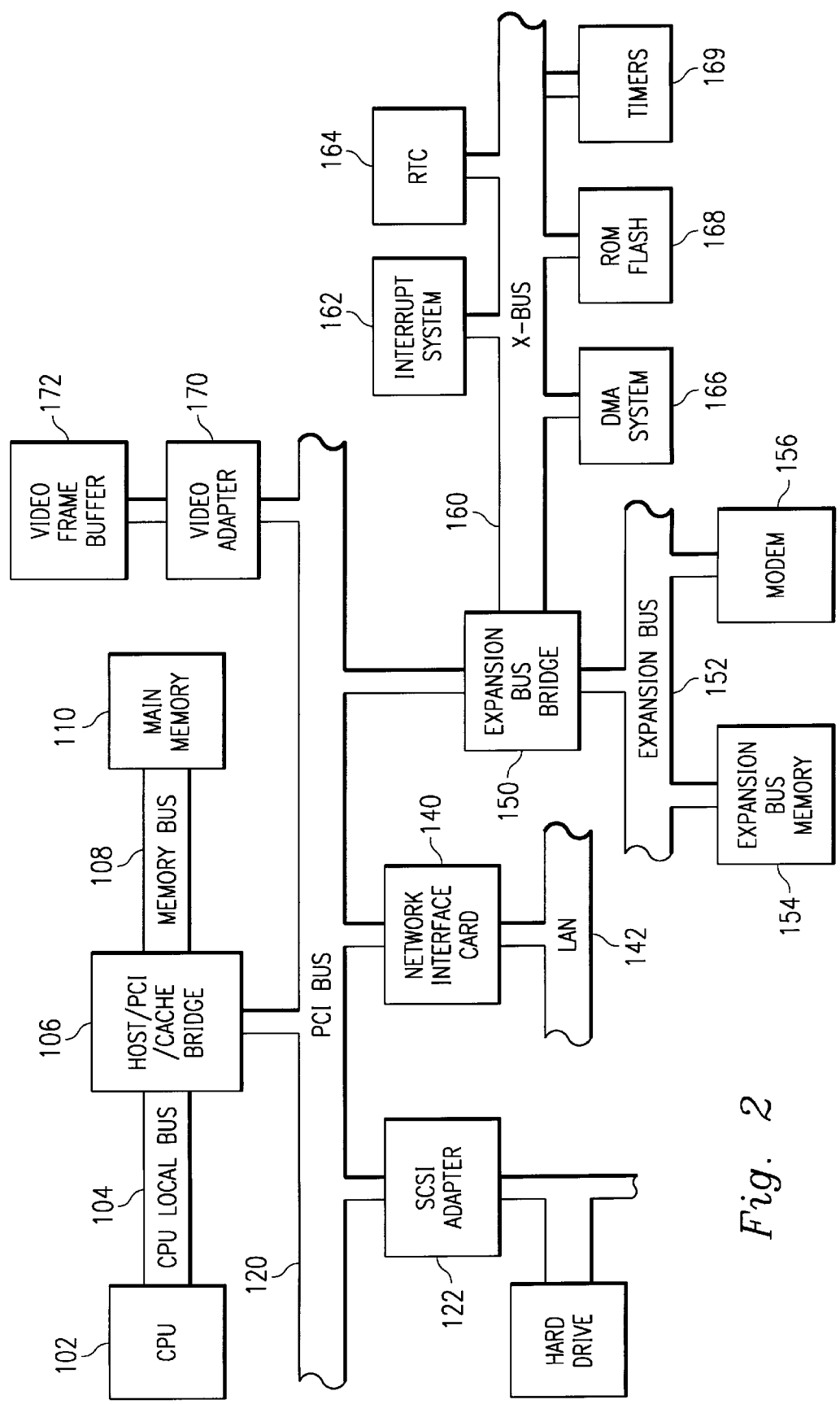
FIG. 2 is a block diagram of the computer system of FIG. 1.

Referring now to FIG. 2, a block diagram illustrating the computer system of FIG. 1 is shown. It is noted that the block diagram of FIG. 2 illustrates a representative computer system, and the present invention may be incorporated into any of various types of computer systems having various architectures. As shown, the computer system includes a central processing unit (CPU) 102 which is coupled through a CPU local bus 104 to a host/PCI/cache bridge 106. The bridge 106 couples through a memory bus 108 to main memory 110. The host/PCI/cache bridge 106 also interfaces to a peripheral component interconnect (PCI) bus 120. In the preferred embodiment, a PCI local bus is used. However, it is noted that other local buses may be used, such as the VESA (Video Electronics Standards Association) VL bus. Also, the computer system may or may not include a local bus, as desired.

Various types of devices may be connected to the PCI bus 120. In the embodiment shown in FIG. 1, a video adapter 170 and video frame buffer 172 are coupled to the PCI bus 120 for controlling video functions. A SCSI (small computer systems interface) controller or SCSI adapter 122 is coupled to the PCI bus 120.

The SCSI adapter 122 includes a SCSI channel for connecting to various devices, such as a hard drive, a tape drive, etc. Various other devices may be connected to the PCI bus 120, depending upon space requirements in the portable computer system. For example, a network interface card 140 connects to the PCI bus 120 which interfaces to a local area network (LAN) 142.

Expansion bus bridge logic 150 is also preferably coupled to the PCI bus 120. The expansion bus bridge logic 150 interfaces to an expansion bus 152. The expansion bus may be any of varying types, including the industry standard architecture (ISA) bus, also referred to as the AT bus, the extended industry standard architecture (EISA) bus, or the microchannel architecture (MCA) bus. Various devices may be coupled to the expansion bus 152, including expansion bus memory 154 and a modem 156. The expansion bus bridge logic 150 also couples to a peripheral expansion bus referred to as the X-bus 160. The X-bus 160 is used for connecting various peripherals to the computer system. As shown, devices coupled to the X-bus 160 include an interrupt system 162, a real time clock (RTC) 164, a direct memory access (DMA) system 166, ROM/Flash memory 168 and timers 169. Other peripherals (not shown) are preferably connected to the X-bus 160, including communications ports, diagnostics ports, command/status registers, non-volatile static random access memory (NVSRAM), etc.

The computer system preferably uses an Intel 486 low power chip set and also preferably uses the WD 8110 power control chip set from Western Digital Corporation. The Intel chip set supports an interrupt referred to as the System Management Interrupt or SMI, which is a high priority interrupt used for power management functions. Various registers are associated with the SMI interrupt which indicate the power management functions that should be performed. The ROM/Plash memory 168 preferably comprises BIOS (Basic Input/Output Services) software, and the power management or system management software is preferably comprised in the BIOS. However, it is noted that the system management software may be comprised in the main memory 110 or optionally in the keyboard controller, such as the Intel 8051 keyboard controller.

As discussed above, the computer system includes several power management states, including a standby state, a suspend state, and a suspend-to-disk (S2D) state. As discussed in the background section, cascading from the suspend state to the zero volt suspend-to-disk state is a very important power saving feature which provides greatly increased power savings over systems which do not cascade from the suspend state to the suspend-to-disk state. However, power managed computer systems are restricted in their activities while in the suspend state. In the suspend state, the timers 169 are not operational and thus these timers cannot be used to calculate the desired period of inactivity which indicates that the computer should cascade from the suspend state to the suspend to disk state. Therefore, heretofore it has been impossible and/or impractical to cascade from the suspend state to the suspend-to-disk state. The system of the present invention uses the real time clock (RTC) 164 as the timer for calculating the period of inactivity which directs the computer system to cascade from the suspend state to the suspend-to-disk state. This provides a simple and convenient mechanism for cascading from the suspend state to the suspend-to-disk state even though the various chip set timers 169 are non-functional in the suspend state. The present invention also intelligently manages the alarm capability of the RTC 164 to not interfere with other application's use of the RTC.

In the preferred embodiment, the system management software in the computer system allows the user to input desired periods of inactivity which indicate when the computer system should cascade from the full-on state to the standby state, and from the standby state to the suspend state, and finally from the suspend state to the suspend-to-disk state. Alternatively, it is noted that these time intervals can be preset within the computer system, as desired. The computer system preferably uses the chip set timers 169 in determining when to cascade from the full-on state to the standby state, and from the standby state to the suspend state.

Figure 3:
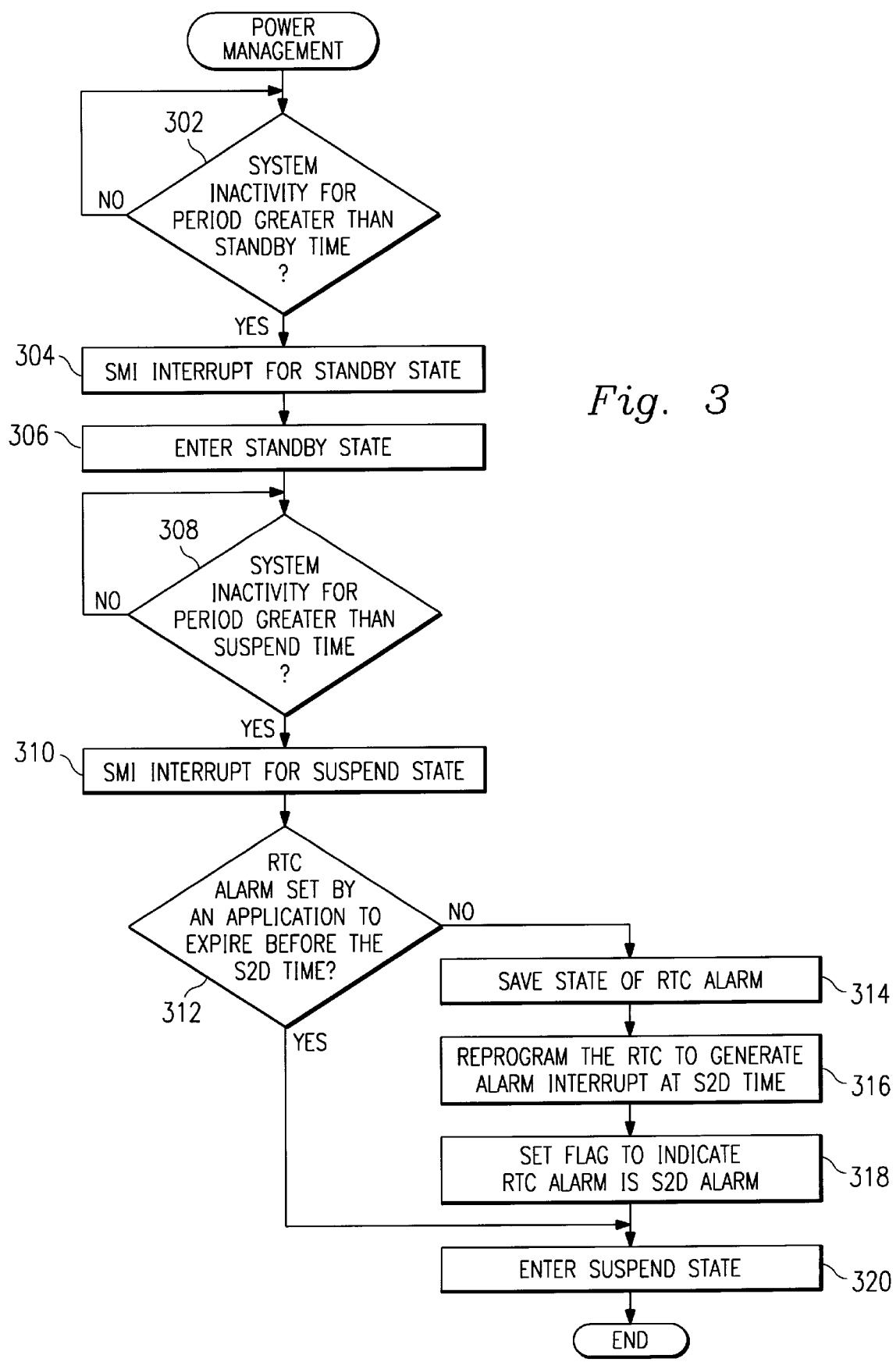
FIG. 3 is a flowchart diagram illustrating operation of the power management software of the present invention cascading from the full-on state to the standby state to the suspend state.

Referring now to FIG. 3, a flowchart diagram illustrating operation of the system management software according to the preferred embodiment of the invention is shown. As mentioned above, the computer system preferably includes user programmable inactivity periods which determine when the computer system cascades from the full-on state to the standby state and then to the suspend state and finally to the suspend-to-disk state. As shown in FIG. 3, if the computer system has been inactive for a period of time greater than the standby inactivity time in step 302, then an SMI interrupt for standby mode is asserted in step 304. As noted above, the SMI interrupt is an interrupt available in the Intel chip set which is used exclusively for power management functions. The SMI interrupt is asserted and the SMI registers are loaded with values indicating that the computer system should cascade to the standby state. In step 306 the computer system enters the standby state, i.e., the system management software turns off power to the hard drive and performs other functions to place the computer system in the standby state. When an additional period of inactivity has elapsed in step 308 which is greater than the period of time set by the user to cascade to the suspend state, an SMI interrupt is generated in step 310 to cascade the computer system to the suspend state. In step 310, the SMI interrupt is generated and one or more registers are loaded with values indicating that the system management software should place the computer system in the suspend state.

Before the computer system is placed in the suspend state, in step 312 the system management software examines the real time clock (RTC) alarm. As discussed above, the RTC 164 can be set by user applications for various timing functions. Here the system management software determines if the RTC alarm is already set by an application and, if so, the period of time before the alarm is set to engage. The system management software determines if the RTC alarm is set by an application to expire before the time that the computer system would cascade to the suspend-to-disk state. If this is case, then operation proceeds from step 312 directly to step 320. As noted above, in this case, the RTC alarm is already set by an application to expire before the suspend-to-disk inactivity time, and thus the RTC alarm cannot be set to the S2D time.

If the RTC alarm is not set or the RTC alarm is set to expire after the suspend-to-disk inactivity time, then in step 314 the system management software saves the state of the RTC alarm to memory 110. Here the system management software preserves the state of the RTC alarm in case the alarm has been set by another application. In step 316 the system management software reprograms the RTC 164 to generate an alarm interrupt at the suspend-to-disk time, i.e., at the time when the user set period of inactivity has elapsed, indicating that the computer should cascade from the suspend state to the S2D state. In step 318, the system management software sets a flag to indicate that the RTC alarm is a S2D alarm. Thus, after a further period of inactivity at the time set by the user, the RTC alarm will trigger the system management software to cascade the computer system to the suspend-to-disk state. In step 320 the system management software causes the computer system to enter the suspend state. Therefore, if the RTC alarm has not been set by a user application to expire before the S2D time, the system management software uses the RTC as a trigger to cascade from the suspend state to the suspend-to-disk state.

Figure 4:
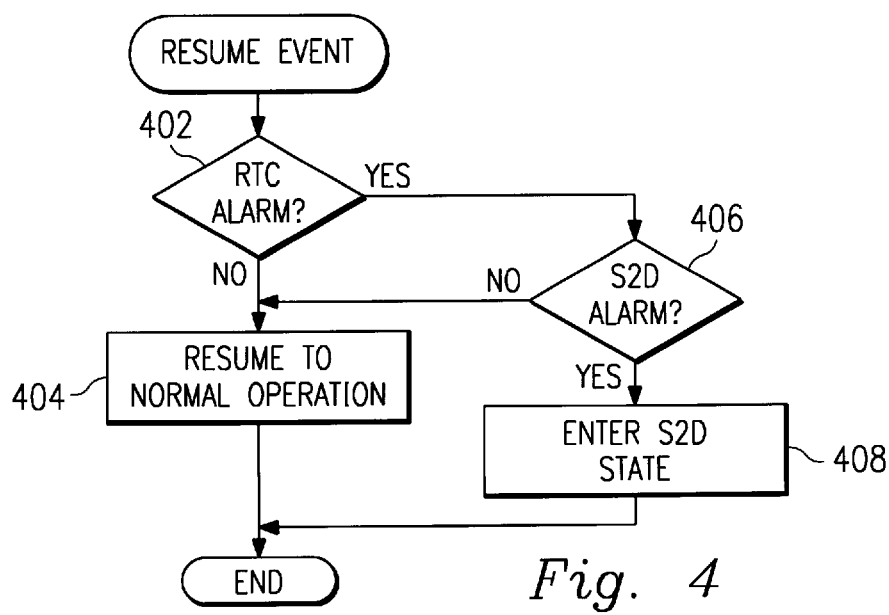
FIG. 4 is a flowchart diagram illustrating operation of a resume event, which could be an RTC alarm causing the computer system to enter the suspend-to-disk state.

Referring now to FIG. 4, a flowchart diagram illustrating operation of the system management software when a resume event occurs is shown. In step 402 the system management software determines if the resume event was an RTC alarm. If not, then the resume event was a "true" resume event, such as the user pressing a key on the keyboard 24 or providing another indication that the computer system is being actively used by the user. In this event, the system management software returns the computer system to normal operation in step 404. If the resume event was an RTC alarm in step 402, then in step 406 the system management software determines whether the RTC alarm was an alarm to indicate a suspend-to-disk period of inactivity, i.e., whether the RTC alarm indicates that the computer system has been inactive for the user defined period of time to signify that the system should cascade from the suspend state to the suspend-to-disk state. Here the computer system checks the flag set in step 318 to determine whether the RTC alarm is a S2D alarm. If the flag is not set, i.e., the RTC alarm was not triggered by a period of inactivity corresponding to the suspend-to-disk state, then the system management software returns the computer system to normal operations in step 404. If the RTC alarm is determined to be a suspend-to-disk alarm in step 406, then in step 408 the system management software causes the computer system to enter the suspend-to-disk state. The system management software removes power completely from the computer system in the suspend-to-disk state, and thus the computer system does not consume any power or minimal power in this state.

It is noted that, when the computer resumes from the suspend-to-disk state, the state of the RTC alarm saved in step 314 is restored. Thus, use of the RTC alarm for power management functions does not interfere with other application's use of the RTC alarm.

Therefore, a system and method for enabling a computer system to cascade from a power managed suspend state to the suspend-to-disk state is shown and described. The system and method of the present invention is independent of operating system and thus can be adapted to various types of systems. Further, the ability to cascade to the suspend-to-disk state provides increased power savings over power managed computer systems which are unable to cascade to the suspend-to-disk state.

Although the method and apparatus of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A method for performing power management operations in a computer system comprising a CPU, memory coupled to the CPU, one or more timers, and a real time clock coupled to the CPU and the memory, the method comprising the steps of:

setting a flag indicating that an of the real time clock alarm is a suspend-to-disk alarm;

determining whether the real time clock alarm has been set by an application to trigger prior to a first time;

if said real time clock alarm has not been set to trigger prior to said first time:
   saving a state of the real time clock alarm; and
   setting the real time clock alarm to trigger at said first time;

the computer system entering a low power state, wherein said one or more timers are not operational in said low power state;

checking said flag to determine whether the real time clock alarm is a suspend-to-disk alarm and, if so, cascading the computer system from said low power state to a suspend-to-disk state responsive to triggering of said real time clock alarm, wherein a configuration of said computer system is saved to a hard drive of said computer system and power is off to said computer system in said suspend-to-disk state;

said computer system resuming normal operation after said cascading; and if said step of saving the state of the real time clock alarm has been performed, restoring said saved state of the real time clock alarm after said step of the computer system resuming normal operation.

2. The method of claim 1, wherein system management software resides in the memory and executes on the CPU to perform power management functions, the method further comprising:

invoking the system management software after a period of inactivity of the computer system and prior to said step of setting, wherein the system management software performs said step of setting said alarm in the real time clock.

3. The method of claim 1, wherein said first time is user programmable.

4. A computer system which performs power management operations comprising:

a CPU;

memory coupled to the CPU, wherein system management software resides in the memory and executes on the CPU to perform power management functions; and a real time clock, coupled to the CPU and the memory, wherein the real time clock includes an alarm that is set to trigger at a first time to indicate that the computer system should cascade to a suspend-to-disk state only if said real time clock alarm has not been set by an application to trigger prior to said first time, said CPU including means for setting a flag indicating that said real time clock alarm is a suspend-to-disk alarm and means for saving a state of the real time clock alarm prior to setting the real time clock alarm to trigger at said first time;

wherein the computer system cascades to said suspend-to-disk state after said real time clock alarm triggers, wherein a configuration of said computer system is saved to a hard drive of said computer system and power is off to said computer system in said suspend-to-disk state;

wherein the computer system resumes normal operation after cascading to said suspend-to-disk state; and wherein the CPU includes means for restoring the saved state of the real time clock alarm after the computer system resumes normal operation.

5. A computer program stored on a computer-readable medium and executable in a computer system comprising a CPU, memory coupled to the CPU, one or more timers, and a real time clock coupled to the CPU and the memory, the computer program for performing power management operations, the computer program comprising:

instructions for setting a flag indicating that an alarm of the real time clock is a suspend-to-disk alarm;

instructions for determining whether the real time clock alarm has been set by an application to trigger prior to a first time;

instructions for saving a state of the real time clock alarm and setting the real time clock alarm to trigger at said first time if said real time clock alarm has not been set to trigger prior to said first time:

instructions for causing the computer system to enter a low power state, wherein said one or more timers are not operational in said low power state;

instructions for checking said flag to determine whether the real time clock alarm is a suspend-to-disk alarm and, if so, cascading the computer system from said low power state to a suspend-to-disk state responsive to triggering of said real time clock alarm, wherein a configuration of said computer system is saved to a hard drive of said computer system and power is off to said computer system in said suspend-to-disk state;

instructions for causing said computer system to resume normal operation after said cascading; and instructions for restoring said saved state of the real time clock alarm after the computer system resumes normal operation if the state of the real time clock alarm has been saved.

6. The method of claim 5 wherein system management software resides in the memory and executes on the CPU to perform power management functions, the computer program further comprising:

instructions for invoking the system management software after a period of inactivity of the computer system and prior to said setting.

7. The method of claim 5 wherein said first time is user-programmable.

* * * * *